United States Patent
Laffranchi et al.

(10) Patent No.: US 10,788,109 B2
(45) Date of Patent: Sep. 29, 2020

(54) ACTUATOR FOR EXOSKELETON

(71) Applicants: FONDAZIONE ISTITUTO ITALIANO DI TECHNOLOGIA, Genoa (GE) (IT); ISTITUTO NAZIONALE PER L'ASSICURAZIONE CONTRO GLI INFORTUNI SUL LAVORO, Rome (RM) (IT)

(72) Inventors: Matteo Laffranchi, Genoa (IT); Stefano D'Angella, Genoa (IT); Samuele Cappa, Genoa (IT); Paolo Uboldi, Genoa (IT); Jody Saglia, Genoa (IT); Carlo Sanfilippo, Genoa (IT); Emanuele Gruppioni, Genoa (IT)

(73) Assignees: FONDAZIONE ISTITUTO ITALIANO DI TECHNOLOGIA, Genoa (GE) (IT); ISTITUTO NAZIONALE PER L'ASSICURAZIONE CONTRO GLI INFORTUNI SUL LAVORO, Rome (RM) (IT)

( * ) Notice: Subject to any disclaimer, the term of this patent is extended or adjusted under 35 U.S.C. 154(b) by 0 days.

(21) Appl. No.: 16/092,882

(22) PCT Filed: Mar. 1, 2017

(86) PCT No.: PCT/IB2017/050971
§ 371 (c)(1),
(2) Date: Oct. 11, 2018

(87) PCT Pub. No.: WO2017/178903
PCT Pub. Date: Oct. 19, 2017

(65) Prior Publication Data
US 2019/0203815 A1    Jul. 4, 2019

(30) Foreign Application Priority Data

Apr. 11, 2016  (IT) .............................. UA2016A2490

(51) Int. Cl.
*F16H 25/22*  (2006.01)
*F16H 25/20*  (2006.01)
*F16H 25/24*  (2006.01)

(52) U.S. Cl.
CPC ......... *F16H 25/2204* (2013.01); *F16H 25/20* (2013.01); *A61H 2201/123* (2013.01);
(Continued)

(58) Field of Classification Search
CPC ....... F16H 2025/204; F16H 2025/2445; F16H 2025/2436; F16H 25/2204; A61H 2201/1215; Y10T 74/18648
(Continued)

(56) References Cited

U.S. PATENT DOCUMENTS 4,565,104 A    1/1986  Akin
5,099,707 A    3/1992  Tori
(Continued)

FOREIGN PATENT DOCUMENTS

DE    19930434 A1    1/2000
DE    202011000479 U1    7/2012
(Continued)

OTHER PUBLICATIONS

International Search Report for PCT/IB2017/050971 dated Jun. 21, 2017.
(Continued)

*Primary Examiner* — Randell J Krug
(74) *Attorney, Agent, or Firm* — Hedman & Costigan, P.C.; James V. Costigan; Kathleen A. Costigan

(57) ABSTRACT

An actuation device (1) comprising a threaded shaft (2) connected at one end to driving means adapted to allow the
(Continued)

threaded shaft (2) to rotate about its longitudinal axis (a). A movable element (3) is provided with a cylindrical cavity (30) adapted to receive the threaded shaft (2), and configured so that a rotation of the threaded shaft (2) corresponds to a translation the movable element (3) along the longitudinal axis (a). The device (1) has two guiding rods (4,4') coupled to the movable element (3) and adapted to constrain the translation of the latter along a direction parallel to the longitudinal axis (a). Element (3) comprises a first (31) and a second (32) element constrained to each other, wherein the first element (31) is coupled to the threaded shaft (2) and the second element (32) is coupled to the two guiding rods (4,4').

5 Claims, 3 Drawing Sheets

(52) U.S. Cl.
CPC ............... *A61H 2201/1215* (2013.01); *F16H 2025/204* (2013.01); *F16H 2025/2436* (2013.01); *F16H 2025/2445* (2013.01); *Y10T 74/18648* (2015.01)

(58) Field of Classification Search
USPC ................. 74/89.32, 89.33, 89.23, 89.36
See application file for complete search history.

(56) References Cited

U.S. PATENT DOCUMENTS

| | | |
|---|---|---|
| 5,507,120 A | 4/1996 | Current |
| 5,881,603 A | 3/1999 | Kitamura |
| 6,116,104 A | 9/2000 | Nagai |
| 7,984,663 B2 | 7/2011 | Dent |
| 2004/0198541 A1* | 10/2004 | Nagai ............... B23Q 11/08 474/25 |
| 2006/0102697 A1 | 5/2006 | Nagai |
| 2011/0113955 A1* | 5/2011 | Fukano ............... H02K 7/06 92/172 |
| 2012/0042740 A1 | 2/2012 | Isobe |

FOREIGN PATENT DOCUMENTS

| | | |
|---|---|---|
| WO | 2010/036791 A1 | 4/2010 |
| WO | 2013/167396 A1 | 11/2013 |

OTHER PUBLICATIONS

Written Opinion of the International Searching Authority dated Jun. 21, 2017.
English Abstract for DE 19930434 A1 dated Jan. 20, 2000.
English Abstract for DE 202011000479 U1 dated Jul. 26, 2012.

* cited by examiner

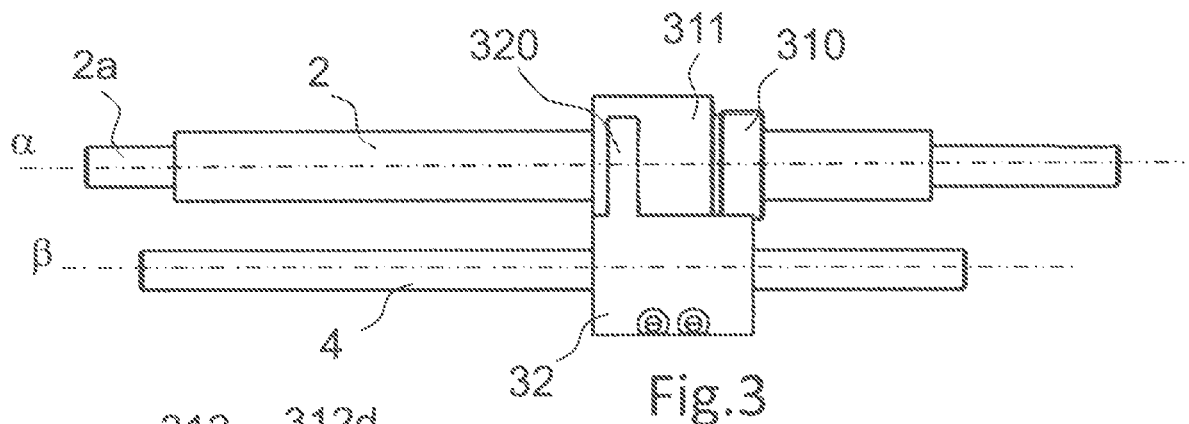
Fig.3
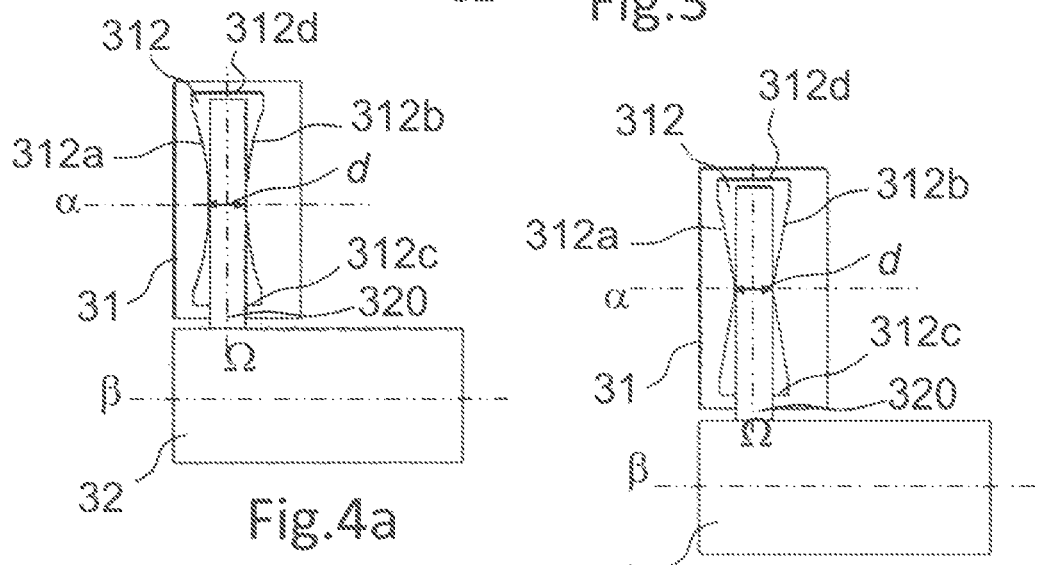
Fig.4a
Fig.4b
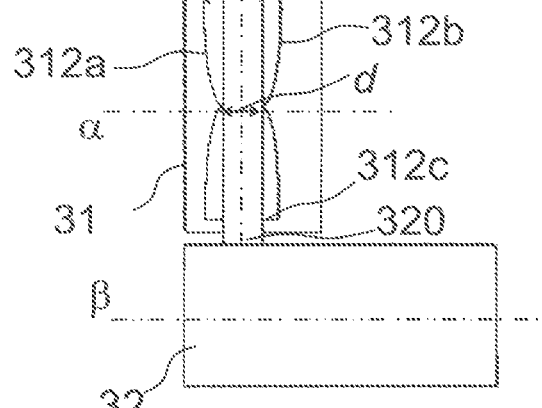
Fig.4c

ACTUATOR FOR EXOSKELETON

TECHNICAL FIELD

The present invention relates to the field of mechatronics, particularly to devices used for converting control commands into torques or mechanical forces.

The present invention particularly relates to linear actuators according to the preamble of claim 1.

Prior Art

One of the main fields of research of mechatronics is that of linear actuators able to convert rotary motion into linear motion. Typically, such actuators have a motor and a force transmitting system aligned with the axis of the joint they actuate.

An example of an actuator providing such arrangement of the components is known by U.S. Pat. No. 4,565,104, which discloses a linear actuator based on a screw-nut screw assembly and which is able, by the rotation of the motor to which the screw is connected, to act as a motion converter from rotary to linear motion, namely allowing the nut to translate along the screw.

Such solution has the drawback of having possible problems in case of a back drive caused by a load misaligned with respect to the axis of rotation of the screw on which the nut screw is centered.

A solution reducing the drawbacks present in the actuator known from U.S. Pat. No. 4,565,104, is disclosed in the American patent U.S. Pat. No. 5,099,707, providing also a linear actuator based on a screw-nut screw assembly acting as a motion converter from rotary to linear motion, but it has, in addition, two linear rails that act for constraining the motion of the nut in a parallel manner to the axis of rotation of the screw, avoiding possible misalignments in presence of high loads on the nut screw. Although the provision of linear rails, however, such actuator does not eliminate problems that can result from misaligned loads during the back drive. The nut is rigidly connected to the component where load is provided.

As said above, actuators known from U.S. Pat. No. 4,565,104 the and from U.S. Pat. No. 5,099,707 allow forces to be exerted substantially in line with the screw, while they can have problems if forces misaligned from the screw are desired to be generated. Such solutions therefore do not allow the necessary flexibility in use to be provided in case of applications where it is necessary to minimize overall dimensions and/or to provide the use of the actuator for exerting forces misaligned from the axis of the screw.

OBJECTS AND SUMMARY OF THE INVENTION

It is the object of the present invention to overcome prior art drawbacks.

Particularly it is the object of the present invention to provide an actuation device allowing back drive of operation and flexibility of use to be improved.

It is also an object of the present invention to provide a compact actuation device.

These and other objects of the present invention are achieved by an actuation device embodying the characteristics of the annexed claim, which form an integral part of the present description.

The idea at the base of the present invention provides to make an actuation device comprising a threaded shaft connected at one end to driving means intended to allow the threaded shaft to rotate about its longitudinal axis. The device further comprises a movable element provided with a cylindrical cavity, intended to receive the threaded shaft, and configured such that a rotation of the threaded shaft corresponds to a translation of the movable element along the longitudinal axis. The device further comprises two guiding rods coupled to the movable element and constraining the translation thereof along a direction parallel to the longitudinal axis. The movable element comprises first and second elements constrained with each other, wherein the first element is coupled to the threaded shaft and the second element is coupled to the two guiding rods. A portion protrudes from the second element and is intended to be fitted into a seat obtained in the first element, and wherein the portion and the seat are shaped such that the contact between the seat and the portion occurs in a contact area within a plane comprising the longitudinal axis and it is parallel to the plane comprising the development axes of the two guiding rods.

Such solution allows the back drive of operation of the actuating device to be improved since the particular constraint between the two elements composing the movable part of the actuator leads to prevent moments transverse to the threaded shaft from being generated. The force applied by the load is always in line with the shaft, allowing the actuation device to properly operate with continuity without incurring binding phenomena and guaranteeing therefore bi-directionality in the translation of the movable element.

Moreover, such arrangement of elements allows the point of application of the force to be misaligned with respect to the threaded shaft. Thus flexibility of use of the device is improved, that is the freedom in designing apparatuses where the device is implemented, is increased, giving them high compactness characteristics. This because the point where the force is applied can be arranged parallel to the shaft, at a congenial distance thereto depending on the layout to be used.

In a preferred embodiment, the actuation device provides the second element to be coupled to each one of the two guiding rods by means of a respective plain bearing, and wherein a ball joint is interposed between the plain bearing and the second element.

The use of plain bearings, for example bushings, and of ball joints further improves back drive of operation of the actuation device. Ball joints allow the bearing to be adapted to the misalignments caused by bending the guiding rods due to the generation of possible moments resulting from the misalignment of the forces applied to the movable element thus avoiding binding of the mechanism.

Further advantageous characteristics of the present invention will be more clear from the following description and from the annexed claims, which are an integral part of the present invention.

BRIEF DESCRIPTION OF THE DRAWINGS

The invention will be described here below with reference to not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

FIG. 3 is a section of a top view of the actuation device according to the invention;

FIGS. 4a, 4b and 4c are sections of top views of a constructional detail of the actuation device according to the invention;

DETAILED DESCRIPTION OF THE INVENTION

While the invention is susceptible of various modifications and alternative constructions, some non-limitative embodiments, provided by way of example, are described in details herein below.

It should be understood, however, that there is no intention to limit the invention to the specific disclosed embodiments but, on the contrary, the invention intends to cover all the modifications, alternative constructions and equivalents that fall within the scope of the invention as defined in the claims.

Therefore in the following description, the use of "for example", "etc.", "or" denotes non-exclusive alternatives without limitation, unless otherwise noted; the use of "also" means "among which, but not limited to", unless otherwise noted; the use of "includes/comprises" means "includes/comprises, but not limited to", unless otherwise noted.

Figure 1:
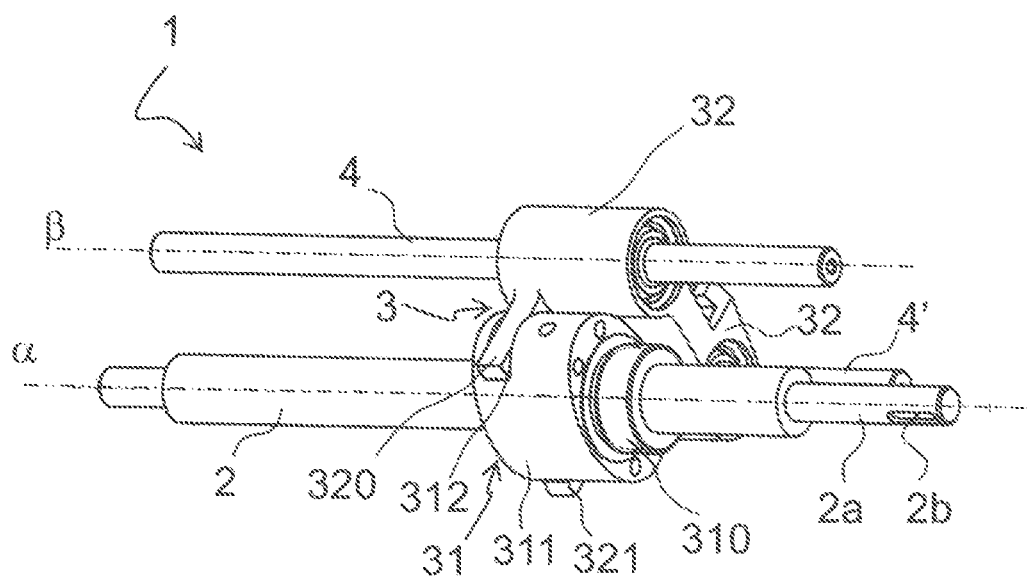
FIG. 1 is an overview of a detail of the actuation device according to the invention.

FIG. 1 shows an overview of a particular linear actuation device 1, briefly as "actuator" below, which is able to convert a rotary motion in a linear motion.

The actuator comprises a motion converting mechanism 1 comprising a threaded shaft 2 on which a mobile element 3 is fitted. The shaft 2 has, at one reduced cross-section end 2a, a seat 2b for the connection to a motor or other driving means, not shown in FIG. 1. By rotating the shaft 2 in a clockwise or anti-clockwise direction about its own longitudinal axis a, the movable element 3 translates forwards and backwards on the shaft 2.

In a preferred embodiment, the threaded shaft 2 and the movable element 3 are coupled such to obtain a ball screw that, as known, provides to use balls running a closed raceway formed between the threaded shaft 2 and the movable element 3, such to reduce friction between these elements during motion. Obviously, other solutions are possible and the shaft 2 can be composed of a simple threaded rod.

Figure 2:
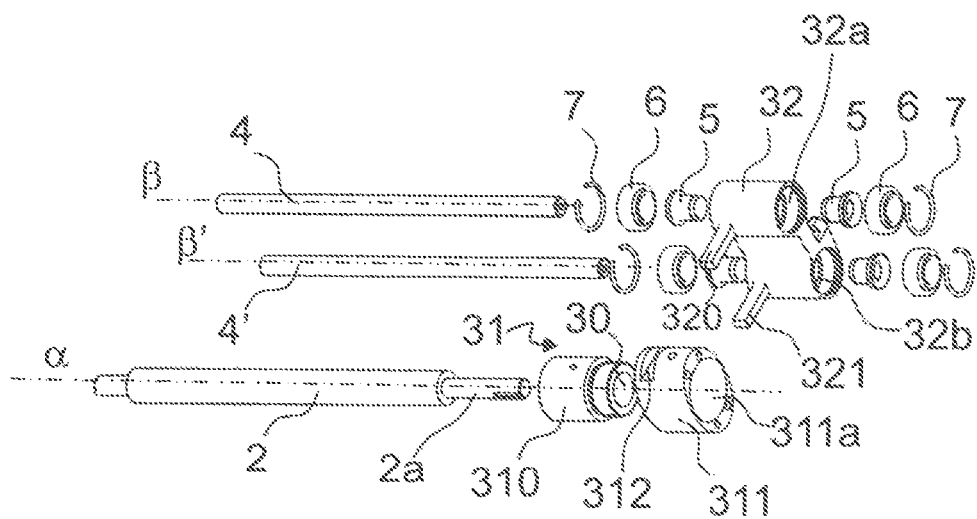
FIG. 2 is an exploded view of the actuation device according to the invention.

In order to obtain the conversion of rotary motion to linear motion, and as visible in FIG. 2, the movable element 3 is an element provided with a cylindrical cavity 30 intended to receive the threaded shaft 2, on whose inner surface a thread is provided that, by mating with the thread of the shaft 2 during the rotation of the latter, causes the movable element 3 to axially run.

More in details, the movable element 3 comprises a first 31 and a second 32 elements constrained to each other. The first element 31 is coupled directly to the threaded shaft 2 through the cylindrical cavity 30, while the second element 32 is coupled to two guiding rods (4,4') developing along the axes β and β' parallel to each other and parallel to the axis a. Thus the guiding rods constrain the translation of the movable element 3 along the direction of the longitudinal axis (α).

In the shown embodiment, the first element 31 further comprises a nut screw 310 and a support element 311 fastened with each other. The cylindrical cavity 30 provided with the thread is obtained in the nut screw 310 that therefore is coupled to the threaded shaft 2.

The support element 311 has also a cavity 311a, to allow the nut screw 310 to be inserted therein, and on its external surface a seat 312 is obtained intended to receive a portion 320 protruding from the second element 32 of the movable element 3. It is suitable to specify that in variant embodiments of the device 1, the seat 312 can be similarly obtained on the nut screw 310 itself, therefore for the purposes of the invention it is sufficient for the seat 312 to be obtained on the first element 31, which is the one coupled to the threaded shaft 2.

More in details, and with reference to FIG. 3, the portion 320 protruding from the second element 32 and the seat 312 are shaped such that the contact between seat 312 and portion 320 occurs in a contact area extending along a section of the portion (320) and whose midpoint lies on a plane comprising the longitudinal axis a and it is parallel to the plane comprising the development axes β and β' of the two guiding rods 4 and 4'.

Preferably, such contact area has a surface ranging from 0.01% to 5% of the surface of the portion 320.

In the examples shown therein, a second portion 321 protrudes from the second element 32, which fits into a second seat (not visible in FIG. 2) obtained on the external surface of the support element 311 of the first element 31.

The two seats are symmetrically arranged with respect to the longitudinal axis a, and they house a respective portion of the two portions (320,321) protruding from the second element 32. Seats and portions (320,321) are shaped such that the respective contact with each other occurs in two corresponding contact areas that extend along a section of the portion (320) and of the portion (321) respectively and whose midpoint of each section lies in a plane comprising the longitudinal axis a and it is parallel to the plane comprising the axes β and β'.

FIGS. 4a, 4b and 4c show some variant embodiments of the shape of the seat 312 and of the portion 320 fitted therein.

In all such variants the portion 320 is a rectangular-based prism developing in a direction orthogonal to the one of the longitudinal axis a and it has a plane of symmetry Ω orthogonal to a.

The seat 312 comprises two side surfaces 312a and 312b, facing each other on opposite sides with respect to the plane of symmetry Ω, each one having a profile shaped such that their minimum distance d is in a central area of the seat 312. Moreover the central area of the seat 312 is a region lying on the plane comprising the longitudinal axis a and also parallel to the plane comprising the development axes β and β' of the two guiding rods 4 and 4'.

In FIG. 4a, the surfaces 312a and 312b develop between an inner end 312c and an outer end 312d of the seat 312, and their profile has such a path that the distance from each other follows a monotonically decreasing path starting from each end 312c and 312d towards the central area of the seat 312, particularly each profile has a curvilinear path with facing convexities.

Differently, in FIG. 4b and in FIG. 4c the two surfaces 312a and 312b although having such a profile that their distance has a monotonic path decreasing towards the central area of the seat 312, they have a rectilinear path and a curvilinear path with facing concavities.

With reference again to FIG. 2 the two guiding rods 4 and 4' are coupled to the second element 32 each one through respective plain bearings 5 and ball joints 6.

Particularly the second element 32 is provided with two cavities (32a,32b) each one intended to receive a respective guiding rod of the two guiding rods 4 and 4', to allow the second element 32 to run with respect thereto.

Each cavity 32a and 32b has, at each one of its two ends, a seat for housing a plain bearing 5 and a ball joint.

The plain bearings 5—for example bushings—and the ball joints 6 are therefore two for each guiding rod. Each plain bearing 5 is in direct contact with a respective rod, and between the second element 32 and each plain bearing 5 there is provided a ball joint 6. FIG. 2 further shows the locking rings 7 that keep the bearings 5 and the ball joints 6 in place inside the respective seats provided in the cavities (32a,32b) of the second element 32.

By such arrangement the ball joints 6 allow the plain bearings 5 to be adapted to the misalignments of the guiding rods (4,4') with respect to their development axes β and β'. The application of forces on the element 32 not in line with the direction of axis a, can generate moments that tend to displace the guiding rods from the axes β and β'; the ball joints 6 and the bearings 5 allow such misalignments to be absorbed and prevent such moments from being transferred on the shaft 2.

Figure 5:
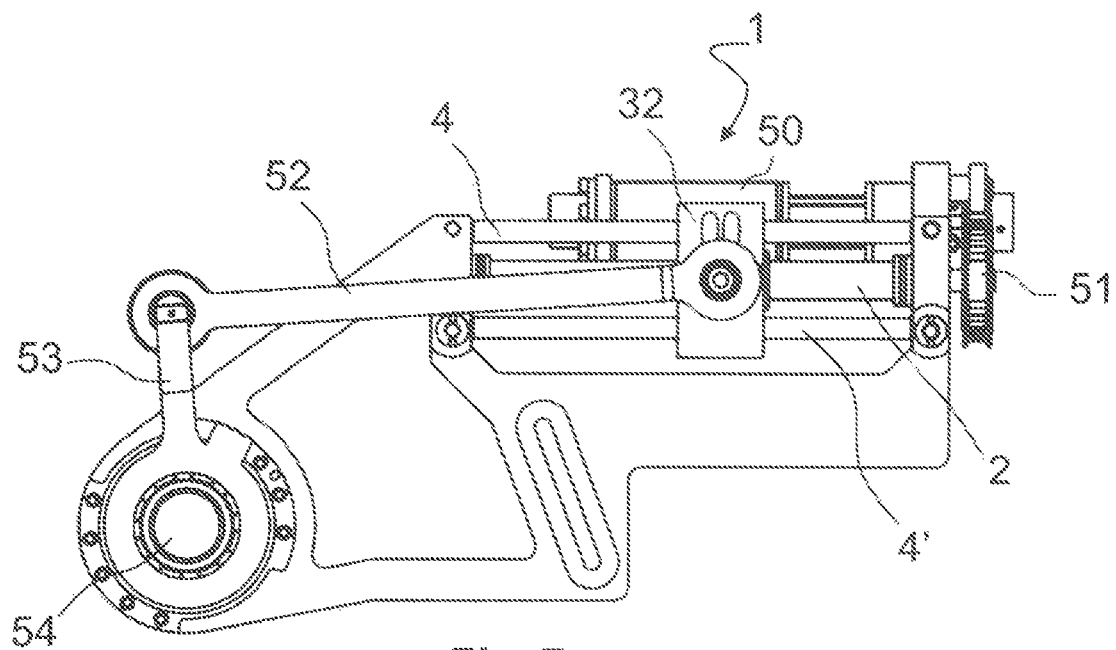
FIG. 5 is a side view of a first example implementing the actuation device according to the invention.

A first implementation example of the invention is shown in FIG. 5 and it provides an apparatus where the actuation device 1 is connected to a crank-connecting rod system. The kinematic chain of such apparatus comprises a motor 50 that, by means of a belt transmission 51, rotates a ball screw 2 on which a movable element 32 translates. This latter is connected to a connecting rod 52 that drives a crank 53 that rotates a joint 54.

This solution allows a very high reduction value between motor and joint to be obtained, as well as it allows back drive of the motion of the movable element 32 to be guaranteed and therefore allowing the torque applied to the device 1 to be estimated by measuring the current on the windings of the motor 50. Thus torque sensors are avoided which are expensive and bulky.

Moreover, the use of a crank-connecting rod mechanism makes the gear ratio variable and dependent on the angle of the joint 54. The non-linearity of the transmission between motor and joint of such solution is thus used in favor of the actuation, for example in the case the torque/velocity profile is a function of the angle of the joint 54. The dependence of the torque and velocity profile on the angular position of the joint 54 and its cyclic repeatability are typical features of joints in legs of human beings and therefore the implementation example shown in FIG. 5, can be used in case of exoskeletons for lower limbs, by means of a suitable angular offset between the axis of the crank 53 and the one of an output connection to the joint 54. Although it is not visible in the figure, such arrangement further has an angular position sensor placed on the joint 54.

Figure 6:
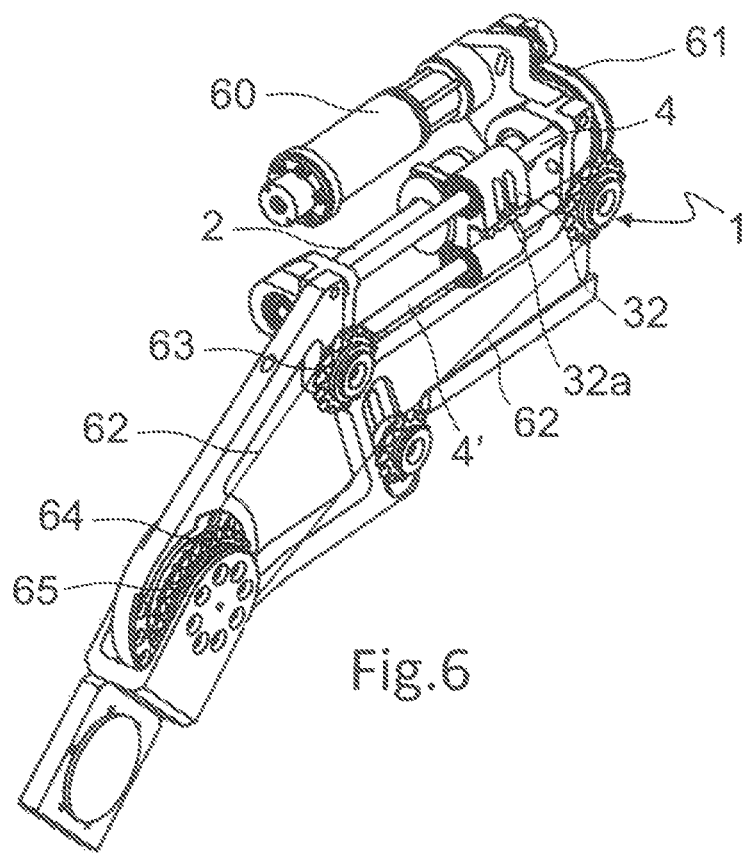
FIG. 6 is an overview of a second example implementing the actuation device according to the invention.

A second implementation example is shown in FIG. 6. Unlike the example of FIG. 5 in this case the final stage of the actuation of the apparatus shown in FIG. 6, has a chain drive instead of a crank-connecting rod mechanism.

In such arrangement, the overall kinematic chain provides a motor 60—such as for example a brushless electric motor or the like—that by a belt transmission 61 transmits a rotary motion to the ball screw 2. The latter allows the movable element 32 to translate which is provided with hooking means 32a to engage the links of a chain 62 that, by engaging a plurality of gear wheels 63, transfers a rotary motion to a ring connected to a joint 65.

The main difference of such solution from the example shown in FIG. 5 is to have a linear transmission, useful if the profile of velocity-torque to be generated to the joint 65 does not depend on the position of the joint. Even such solution guarantees the back drive of the motion of the movable element 32, since the use of the actuation device 1 according to the invention allows the mechanism of the ball screw 2 not to be stopped during the translation motion of the movable element 32. Also in this case therefore the torque transmitted to the joint 65 can be estimated by measuring the phase current of the motor.

Moreover, the use of a chain has the advantage of making such solution noiseless, since it does not use planetary reduction gears and the advantage of obtaining minimized lateral overall dimensions of the apparatus where the actuation device 1 is implemented.

Both the examples of FIGS. 5 and 6 can be applied as kinematic chains in an exoskeleton.

From the above description it is clear how the described reduction gear allows the above objects to be achieved.

Therefore, it is clear for a person skilled in the art that it is possible to make changes and variants to the solution described with reference to the above figures without for this reason departing from the scope of protection of the present patent as defined in the annexed claims.

For example, the seats of the element 31 and the portions of the elements 32 inserted therein can have shapes different from those shown in FIGS. 4a, 4b and 4c. For example it is possible to provide rectangular prism shaped portions as in FIGS. 4a-4c but side surfaces of the seats (312a and 312b) with different paths, also irregular, provided that the contact with the portion 320 and side walls occurs only at a plane parallel to the plane comprising the development axes β and β' and passing by a. As an alternative then it is possible to have profiles and seats with shapes conjugate with respect to the above. For example the seats may have a rectangular plan and the portions of the element 32 fitted therein may have any shape with a maximum width in the contact area that, as mentioned above, has to lie on a plane parallel to the plane comprising the development axes β and β' and passing by a.

The invention claimed is:

1. An actuation device (1) comprising,
  a threaded shaft (2) connected at one end to driving means adapted to allow the threaded shaft (2) to rotate about its longitudinal axis (a),
  a movable element (3) provided with a cylindrical cavity (30) adapted to receive the threaded shaft (2), said cylindrical cavity (30) being configured in such a way that a rotation of the threaded shaft (2) corresponds to a translation of the movable element (3) along said longitudinal axis (a),
  two guiding rods (4,4') coupled to the movable element (3) and adapted to constrain the translation of the latter along a direction parallel to said longitudinal axis (a),
  characterized in that
  the movable element (3) comprises a first element (31) and a second (32) element constrained to each other, wherein said first element (31) is coupled to the threaded shaft (2) and said second element (32) is coupled to said two guiding rods (4,4'),
  and in that
  a portion (320) protrudes from said second element (32) adapted to fit into a seat (312) formed in said first element (31), and wherein said portion (320) and said seat (312) are shaped in such a way that the contact between the seat (312) and the portion (320) takes place in a contact zone that extends along a section of the portion (320) where a midpoint of said portion (320) lies in a plane which comprises said longitudinal axis (a) and is parallel to the plane which comprises the development axes (β,β') of said two guiding rods (4,4')
wherein said seat (312) comprises two surfaces (312a, 312b) facing each other and which have a profile shaped in such a way that a minimum distance (d) between said two surfaces (312a,312b) is at a central region of said seat (312), and wherein said central region extends for a section having a midpoint that lies on the plane that comprises said longitudinal axis (a) and is parallel to the plane which comprises the development axes (β,β') of said two guiding rods (4,4')
and said profile has a monotonically decreasing trend from the ends (312c, 312d) of said seat towards the central region of said seat (312), and wherein said monotonically decreasing trend is rectilinear or curvilinear.

2. The actuation device (1) according to claim 1, wherein said first element (31) comprises a second seat arranged symmetrically to said seat (312) with respect to a plane passing through the longitudinal axis (a) and orthogonal to the plane which comprises the development axes (β,β') of said two guiding rods (4,4'), and wherein a second portion (321) protrudes from said second element (32) adapted to be inserted in said second seat, and wherein said second portion (321) and said second seat are shaped in such a way that the contact between the second seat and the second portion (321) takes place in a second contact zone which extends along a section of the second portion (321) where a midpoint of said second portion (321) lies in the plane which comprises the longitudinal axis (a) and is parallel to the plane which comprises the development axes (β,β') of the two guiding rods (4,4').

3. The actuation device (1) according to claim 1, wherein said seat (312) and said portion (320) are shaped in such a way that a contact zone between said seat (312) and said portion (320) has a surface ranging from 0.01% to 5% of the surface of said portion (320), wherein said contact zone extends symmetrically with respect to the plane that comprises said longitudinal axis (a) and is parallel to the plane which comprises the development axes (β,β') of said two guiding rods (4,4').

4. The actuation device (1) according to claim 1, in which said first element (31) comprises a nut (310) and a supporting element (311) fixed to each other, in which the nut (310) is coupled to the threaded shaft (2) and wherein said seat (312) is formed on said supporting element (311).

5. The actuation device (1) according to claim 1, wherein the threaded shaft (2) is a ball screw.

* * * * *